Jan. 28, 1969  W. F. VIEROW  3,424,952

POWDER ON WIRE CAPACITOR

Filed June 27, 1966

INVENTOR
WILLIAM F. VIEROW
BY
ATTORNEY

United States Patent Office 3,424,952
Patented Jan. 28, 1969

3,424,952
POWDER ON WIRE CAPACITOR
William F. Vierow, Carmel, Ind., assignor to P. R. Mallory & Co. Inc., Indianapolis, Ind., a corporation of Delaware
Filed June 27, 1966, Ser. No. 560,609
U.S. Cl. 317—230                    13 Claims
Int. Cl. H01g 9/02, 9/05

ABSTRACT OF THE DISCLOSURE

A capacitor and a method for making the same wherein masses of film-forming powder are shaped around a wire by positioning a wire to extend through a plurality of mold cavities, depositing powder in the mold cavities, and fusing the powder masses to the wire in situ to thereby bond each mass to the wire.

---

The present invention relates to electrolytic capacitors and more particularly relates to novel solid electrolytic capacitors.

It is well known that solid electrolytic capacitors may be fabricated by the following method: A porous sintered slug of a metal such as tantalum, zirconium, aluminum, niobium and titanium is anodized in an electrolyte to form an oxide layer on the surfaces of the slug. The oxide layer serves as a dielectric layer for the capacitor. A semiconductor coating is applied over the dielectric oxide layer, and an electrically conductive coating is applied over the semiconductor coating. The semiconductor coating and electrically conductive coating sreve as a cathode for the capacitor and the original metallic slug serves as an anode for the capacitor. After connecting leads to the base metal (anode) and to the conductive coating (cathode), the solid electrolytic capacitor is sealed in a metal case or molded in a plastic resin.

As a specific example of the above-established general process, assume that the basic slug is a porous tantalum slug obtained by pressing tantalum powder in a suitable binder and then sintering the slug obtained thereby. The tantalum slug is then anodized in an electrolyte such as phosphoric acid to form a tantalum oxide layer thereover. A semiconductor material, such as manganese dioxide, is closely attached to the tantalum oxide layer by dipping the anodized slug in an aqueous solution of manganese nitrate and by converting the manganese nitrate to manganese dioxide by pyrolysis. A conductive coating, such as a mixture of graphite and silver, is then applied over the manganese dioxdie coating. Terminating means are soldered or otherwise attached to the conductive coating.

There are several problems involved in fabricating solid electrolytic capacitors using the methods generally described above. For instance, the pressing of tantalum powder and the binder usually associated therewith tends to contaminate the tantalum slug resulting therefrom. The attaching of a terminating means to the basic tantalum slug in order to provide an anode lead sometimes results in minute fractures and cracks at the point where the terminating means is attached. These minute cracks and fractures often result in breakdown of the dielectric oxide coating.

In the practice of the present invention, pressing of powdered metal and the binder usually associated therewith is entirely eliminated. Also, an anode lead is integrally formed with the basic slug, thereby eliminating the aforementioned problems having to do with attaching a terminating means to a slug. Specifically, the present invention involves placing a wire in a mold having a plurality of cavities formed therein. The wire is disposed so as to extend substantially through the centers of each of the cavities. Metallic powder is then placed in each of the cavities and is presintered at a suitable temperature and for a suitable time so as to obtain hardened pellets fusibly held to the wire. It can be seen, therefore, that the present invention relates to a group of unitarily fabricated capacitor anodes comprising a plurality of porous sintered masses of metal fused to a wire.

Other objects and features of the present invention will become apparent as this specification progresses.

It is an object of the present invention, therefore, to provide a novel process for manufacturing solid electrolytic capacitors.

It is another object of the present invention to provide a group of unitarily fabricated capacitor anodes.

It is a further object of the present invention to provide a process for fabricating solid electrolytic capacitors wherein the usual step of pressing metallic powder and the binder associated therewith is eliminated.

It is still another object of the present invention to provide a capacitor anode having a shape determined by presintering metallic powder in a mold cavity having a predetermined size and shape.

It is yet another object of the present invention to provide a capacitor anode having a porous sintered mass of metal formed about a wire of the same metal.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in connection with the accompanying figures of the drawing, and wherein like reference characters describe elements of similar function therein and wherein the scope of the invention is determined rather from the dependent claims.

For illustrative purposes the invention will be described in connection with the accompanying drawing in which.

Generally speaking, the present invention is a group of unitarily fabricated solid electrolytic capacitors. The capacitors are comprised of a plurality of porous sintered masses of a metal fused to a wire of the same metal. The wire extends through substantially the center of the metal masses. There is a dielectric oxide coating on the surfaces of each of the metal masses and semiconductor coatings over the dielectric oxide coatings. The semiconductor coatings are limited to the areas covered by the dielectric oxide coatings. There are conductive coatings over the semiconductor coatings. The conductive coatings are limited to the areas covered by the semiconductor coatings. Terminating means are attached to each of said conductive coatings to provide cathode electrodes.

Figure 1:
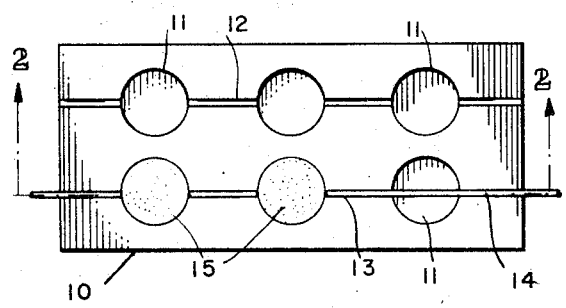
FIGURE 1 is a top view of a mold utilized in the practice of the present invention.

Referring now to the drawing, and particularly to the top view shown in FIGURE 1, the means and methods for practicing the present invention may be visualized in conjunction with the following description.

There is a mold 10 fabricated out of a material capable of withstanding the presintering or sintering temperatures of metals such as tantalum, niobium, aluminum, titanium and zirconium. For instance, boron nitride or molybdenum have melting temperatures sufficiently higher than the presintering temperatures of the aforementioned metals.

A plurality of cavities 11 have been formed in the mold 10. In the illustrative embodiment discussed in this specification, the cavities 11 are cylinders formed by drilling or otherwise cutting into the mold material. The cavities 11 may be arranged in any pattern in the mold, but for convenience, will usually be arranged in straight lines so as to facilitate the extension of wire therethrough.

There are slots 12 and 13 cut through the centers of the cavities 11. In the practice of the present invention, a wire such as the wire 14, will be placed in the slots 12 and 13 so as to extend through the cavities 11. The wire 14 will be of the same metal as the metal of the capacitor anode. For instance, if tantalum capacitor anodes are being fabricated, the wire 14 will be tantalum.

It can be seen in FIGURE 1 that a pair of cavities 11 have been filled with metallic powder 15. In the practice of the present invention, a wire 14 is placed in the slots 12 and 13 and all of the cavities are filled with metallic powder. Usually, the metallic powder is dried in the cavities 11 and then either presintered or sintered and fused to the wire 14. Specific process details of the present invention will be provided infra in this specification.

Figure 2:
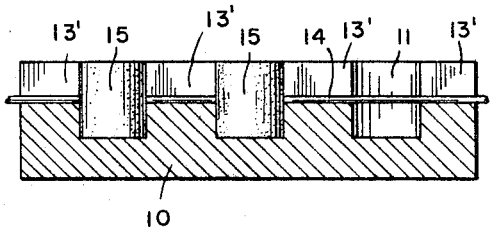
FIGURE 2 is a side sectional view 2—2 of the mold shown in FIGURE 1.

Referring now to FIGURE 2, a side sectional view of the mold 10, wire 14 and metallic powder 15 contained in the cavities 11 can be discussed.

The slot 13, cut in the mold 10, extends through the center of the cavities 11. In between each cavities 11, therefore, is an open space not filled by the wire 14. After the wire 14 is disposed as shown, the open spaces, indicated by the reference number 13', may be filled with an insert so as to prevent the metallic powder 15 from getting into the spaces. The inserts, not shown in the drawing, would be fabricated of the same material as the mold 10.

Figure 3:
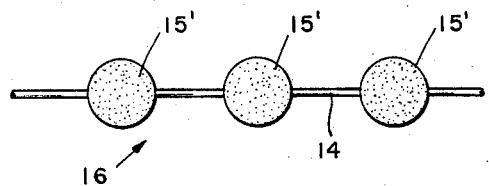
FIGURE 3 is a top view of a string of pellets formed in the mold shown in FIGURE 1.

Referring now to FIGURE 3, a string 16 of hardened metallic powder pellets formed on a wire can be discussed.

The pellets, indicated by the reference number 15', are formed by presintering or sintering the metallic powder 15 deposited in the cavities 1 shown in FIGURES 1 and 2.

Figure 4:
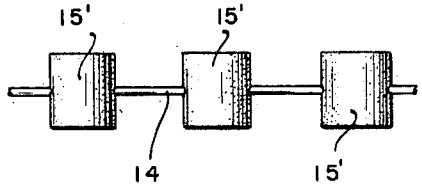
FIGURE 4 is a side view of the string of pellets shown in FIGURE 3.

A side view of the string 16 of pellets 15' is shown in FIGURE 4.

Figure 5:
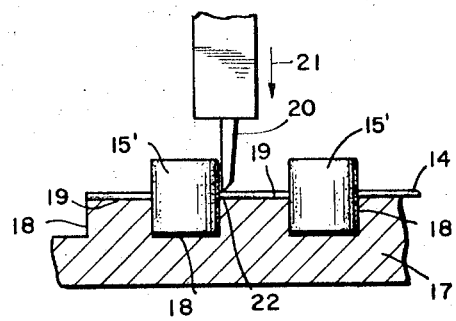
FIGURE 5 is an illustration of a means for separating the string of pellets.

Referring now to FIGURE 5, a side view of a simplified means for separating the pellets 15' can be discussed.

The string 16 of pellets 15' are placed on a holding member 17 having cavities 18 for holding the pellets 15' so that the connecting wire 14 is disposed on the top surface 19 of the member 17. There is cutting means 20 adapted to be moved in the direction of the arrow 21 so as to separate the pellets 15' from the wire 14 at a point 22, adjacent to the pellets 15'. After the cutting operation, each pellet 15' will have a section of the wire 14 extending therefrom so as to provide an anode terminating means. During the cutting operation, the pellets 15' may or may not have the dielectric, semiconductor, and conductive coatings thereover as will be discussed later in the process description.

Figure 6:
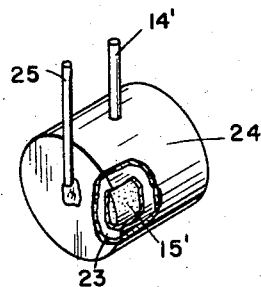
FIGURE 6 is a perspective view of a capacitor formed by the techniques of the present invention.

Referring now to FIGURE 6, a capacitor fabricated by the methods of the present invention can be discussed.

The pellet 15' having a wire lead 14' extending therefrom and an anodic oxide coating thereover is coated with a semiconductor layer 23 and a conductive layer 24. The anodic oxide coating is not shown in FIGURE 6. A cathode lead 25 is soldered or otherwise connected to the conductive layer 24.

Figure 7:
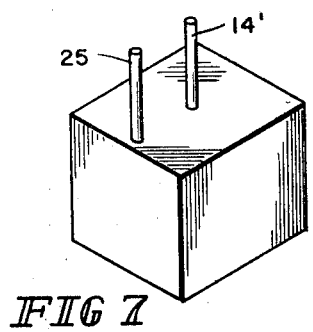
FIGURE 7 is a perspective view of the capacitor shown in FIGURE 6 after encapsulation.

In FIGURE 7, it can be seen that the capacitor shown in FIGURE 6 has been encapsulated in a plastic, such as epoxy resin, for protection and insulation.

With the above description in mind, and by making reference to the drawing figures, the following illustrative method for fabricating solid electrolytic tantalum capacitors will serve to convey the details of the present invention.

Annealed high purity tantalum wire 14 is placed in the slots 12 and 13 of the mold 10. Tantalum powder is then placed in the cavities 1. As pointed out previously, it may be necessary to provide inserts in the slot spaces 16 between the cavities 11 so as to contain the tantalum powder in the cavities.

The tantalum powder may be dry or it may be moistened with liquids such as water, acetone, alcohol, benzene, toluene, and distilled water mixed with glycol, all of which act as a binder that will not leave a residue upon evaporation nor contaminate the tantalum.

The mold 10 containing the tantalum powder and wire 14 is then placed in a furnace and presintered at a temperature which will harden the powder and join the hardened powder pellets 15' to the wire. A furnace temperature of 1400–1500° C. for 5 to 15 minutes is usually sufficient to accomplish this purpose. It is to be pointed out that sintering and presintering must take place in an inert atmosphere or in a vacuum.

The hardened pellets 15' connected by the wire 14 are then final sintered at a temperature of 1800–2200° C. for 15 to 45 minutes.

After the final sintering, the pellets 15' and wire 14' are anodized to develop a dielectric oxide coating thereover. Typically, the anodization takes place in a phosphoric acid electrolyte and at a formation voltage determined to be desirable for a particular capacitor.

After anodization, the wire 14 connecting the pellets 15' is coated with a masking material such as RTV silicone rubber or epoxy resins. The pellets 15' are then coated with a semiconductor material such as manganese dioxide. The manganese dioxide coating is formed by dipping the pellets 15' into manganese nitrate and converting the manganese nitrate to manganese dioxide by pyrolysis. The semiconductor layer is then coated with a conductive layer, such as graphite and silver. The masking material on the wire 14 prevents adherence of the semiconductor and conductive materials to the wire 14.

After the conductive coating is applied, the individual pellets 15' may be separated as disclosed in conjunction with FIGURE 5. The bare tantalum resulting from the separation of individual pellets 15' is coated to prevent shorting of the capacitor. Obviously, the conductive coating and semiconductor coating must be separated from the bare tantalum by the anodically formed dielectric oxide coating in order to prevent an anode-to-cathode short.

It is to be pointed out that the tantalum pellets 15' connected by the wire 14 may be separated into individual pellets before the anodization process. In this case, each individual pellet would be treated as a separate anode and would be anodized, coated with a semiconductor material and then coated with a conductive material.

After the aforementioned conductive coating is applied, the cathode terminating means is soldered or otherwise attached to the conductive coating.

The final step in the process involves encapsulation of the capacitor.

The process, as hereinbefore described, is especially applicable for a continuous processing system. For instance, several molds 10 can be used together to provide continuous strings of pellets which can be continuously processed through anodizing tanks, manganese nitrate tanks, continuous furnaces for converting the manganese nitrate to manganese dioxide and tanks containing a conductive solution.

The capacitor anode of the present invention and the process for making same, as hereinbefore described, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. A group of unitarily fabricated capacitors comprising a metal wire having a plurality of porous sintered masses of said metal fused thereto, said wire extending through substantially the center of said masses, a dielectric oxide coating on the surfaces of each of said masses said metal, a semiconductor coating disposed over said dielectric oxide coatings, said semiconductor coatings being limited to the area covered by said dielectric oxide coating, a conductive coating over said semiconductor coatings, said conductive coatings being limited to the area covered by said semiconductor coatings, terminating means attached to each of said conductive coatings.

2. A group of unitarily fabricated capacitors as in claim 1 wherein said metal is tantalum, said dielectric oxide coating is tantalum oxide, and said semiconductor coating is manganeses dioxide.

3. A process for fabricating solid electrolytic capacitor anodes from powdered metal and a wire of said metal, said process comprising the steps of: placing said wire in a mold having a plurality of cavities formed therein, said cavities having a predetermined size and shape, said wire extending substantially through the center of each of said cavities; placing said powdered metal in said cavities; presintering said powdered metal in said cavities to form hardened pellets fusibly held to said wire; removing said wire and said pellets from said mold and sintering said pellets; and separating said pellets and said wire so as to provide individual pellets having a wire extending therefrom.

4. A process as in claim wherein said metal powder is moistened prior to placing it in said cavities.

5. A process as in claim 3 wherein said powder is presintered at 1400 to 1500° C. for 5 to 15 minutes.

6. A process for fabricating solid electrolytic tantalum capacitors from powdered metal and a wire of said metal, said capacitors having a tantalum oxide coating, manganese dioxide coating, conductive coating and terminating means, said process comprising the steps of: placing said wire in a mold having a plurality of cavities formed therein, said cavities having a predetermined size and shape, said wire extending substantially through the center of each of said cavities; placing said powdered metal in said cavities; presintering said powdered metal in said cavities to form hardened pellets fusibly held to said wire; removing said wire and said pellets from said mold and sintering said pellets; anodizing said pellets and said wire to form said tantalum oxide coating thereover; applying said manganese dioxide coating over said pellets; applying said conductive coating over said manganese dioxide coating, said conductive coating being limited to the area covered by said manganese dioxide coating; separating said pellets from said wire so as to leave a portion of said wire extending from each of said pellets; and attaching said terminating means to the conductive coatings, said terminating means providing a cathode electrode and said portion of said wire providing an anode electrode.

7. In a method for fabricating anodes suitable for use in electrical capacitors wherein separate masses of a powder of a film-forming metal are shaped and thereafter sintered to convert them each to porous pellets which constitutes an anode for one of said capacitors, the improvement comprising, prior to said sintering, shaping masses of said powder around a wire by
providing a plurality of molding cavities,
positioning the wire to extend through each of said molding cavities,
depositing moistened powder of said metal in each of said molding cavities until they are substantially completely filled whereby the powder assumes a mass shape conforming with that of said molding cavities, and
then fusing the powder masses to said wire, in situ to bond each to said wire.

8. The method of claim 7, wherein said moistened powder consists essentially of a film-forming metal powder selected from the group consisting of tantalum, niobium, aluminum, titanium and zirconium and a liquid selected from the group consisting of water, acetone, alcohol, benzene, toluene and glycol.

9. The method of claim 8, wherein said metal powder is tantalum and said liquid is water.

10. The method of claim 7, wherein said powder masses are fused to said wire at a temperature in the range of about 1400° C. and about 1500° C.

11. A method for making electrical capacitors from the anodes made in accordance with claim 7 which comprises the steps of
anodizing each of the porous pellets and the wire to form a dielectric oxide coating of said metal on the surfaces of said pellets and said wire,
applying separate cathode layers over each of said porous pellets, and
attaching a connector lead to each of said cathode layers.

12. The method of claim 11, which further comprises separating each of the respective porous pellets from the others.

13. The method of claim 11, wherein the cathode layers are applied to each pellet by
forming a coating of a solid electrolyte over the dielectric oxide coating,
applying a coating of graphite over the solid electrolyte, and
then applying a metallic coating over the graphite.

References Cited

UNITED STATES PATENTS

| | | | |
|---|---|---|---|
| 2,198,702 | 4/1940 | Koehring | 75—222 |
| 3,144,328 | 8/1964 | Doty | 75—200 |
| 3,375,413 | 3/1968 | Brill | 317—231 |

JAMES D. KALLAM, *Primary Examiner.*

U.S. Cl. X.R.

29—592; 75—200